Feb. 13, 1968  H. A. JANICEK, JR  3,368,718
SODA FOUNTAIN BEVERAGE DISPENSER
Filed March 3, 1966  4 Sheets-Sheet 1

INVENTOR
HUBERT A. JANICEK, Jr.
BY Patrick J. Henry
ATTORNEY

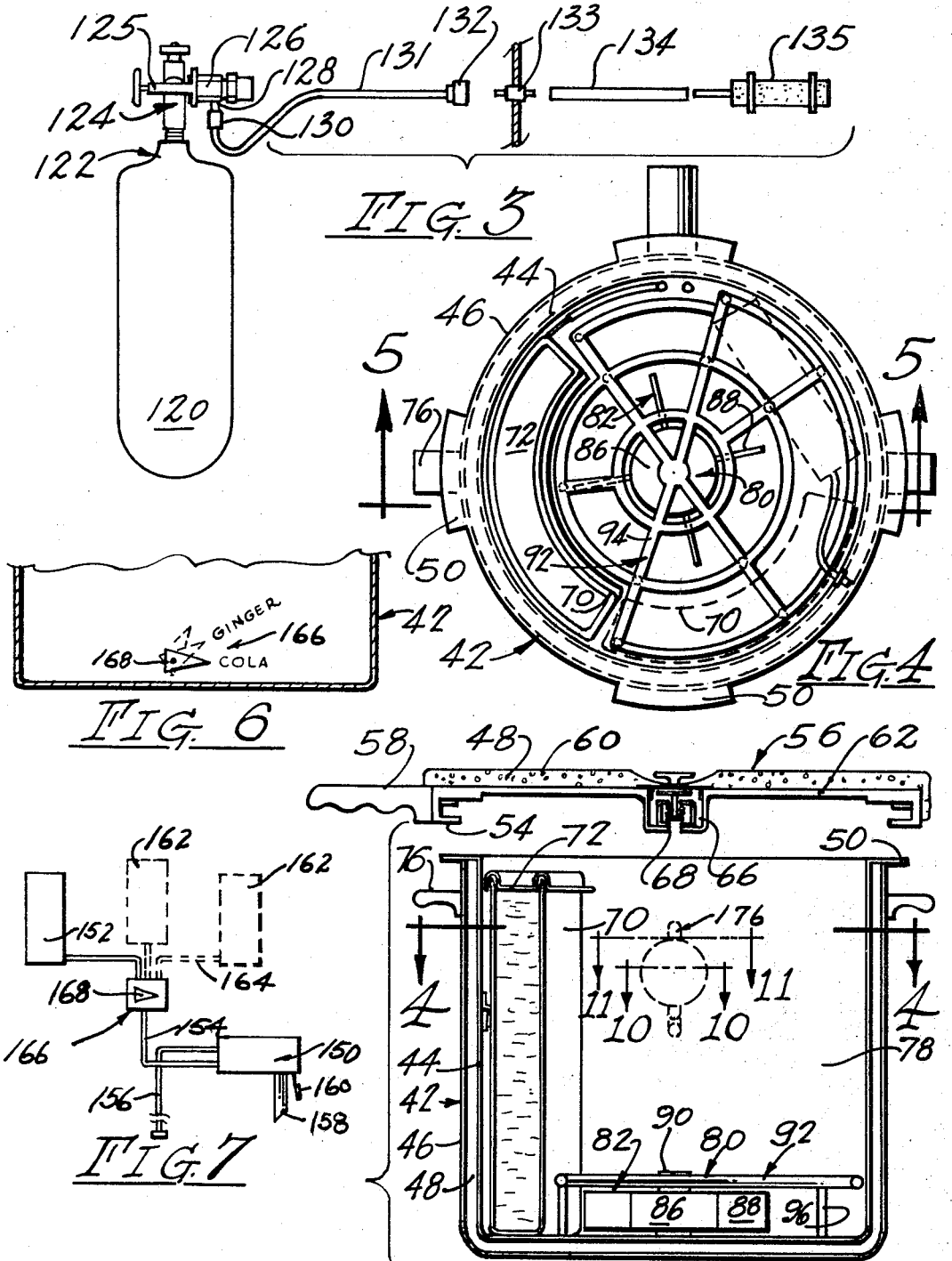

Feb. 13, 1968 H. A. JANICEK, JR 3,368,718
SODA FOUNTAIN BEVERAGE DISPENSER
Filed March 3, 1966 4 Sheets-Sheet 3
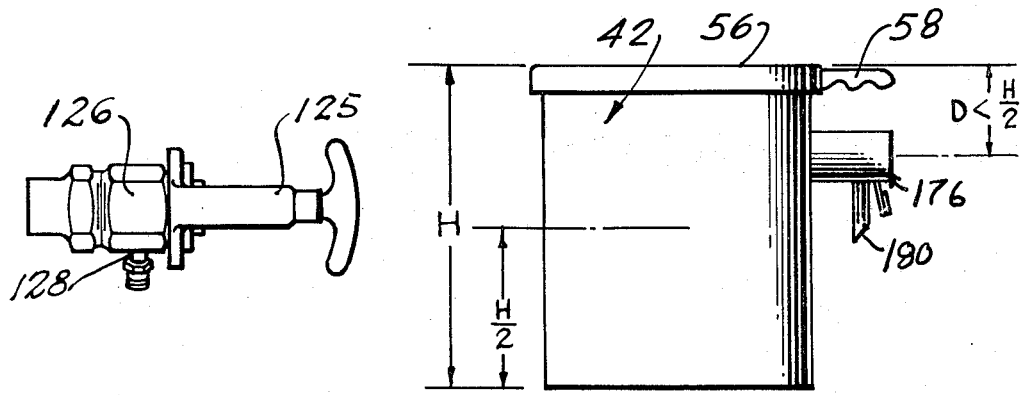
FIG. 8  FIG. 9
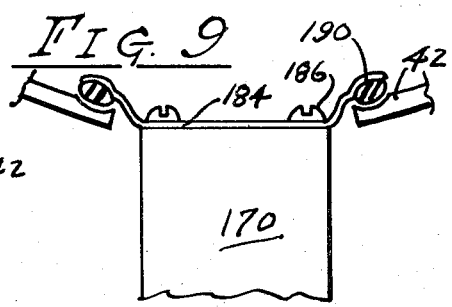
FIG. 10
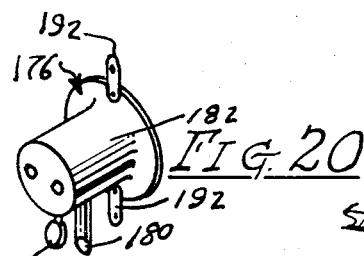
FIG. 11
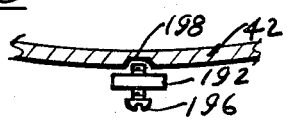
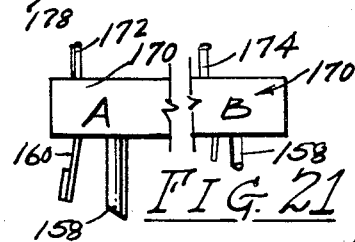
FIG. 20  FIG. 12
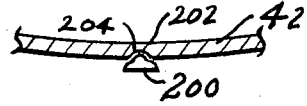
FIG. 13
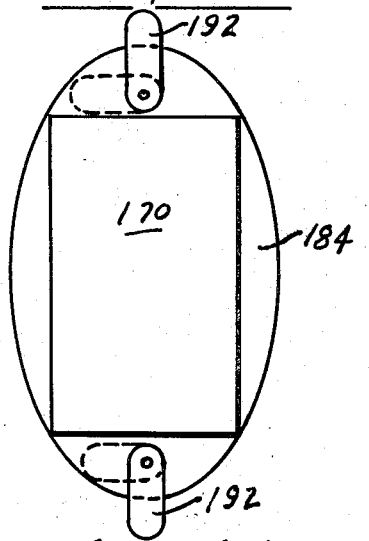
FIG. 14
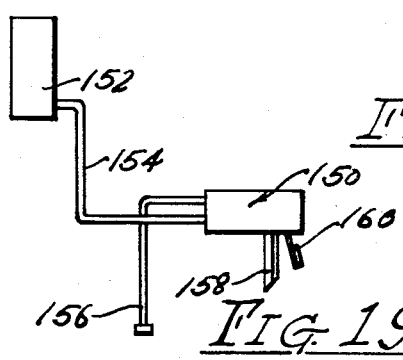
FIG. 21  FIG. 19
INVENTOR
HUBERT A. JANICEK, Jr.
BY
ATTORNEY Feb. 13, 1968   H. A. JANICEK, JR   3,368,718
SODA FOUNTAIN BEVERAGE DISPENSER
Filed March 3, 1966   4 Sheets-Sheet 4
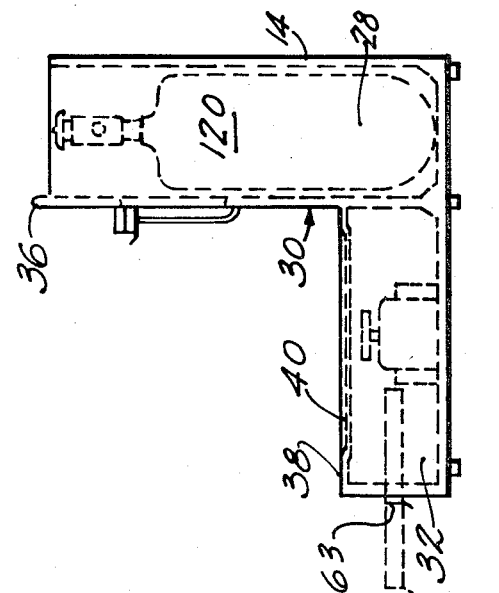
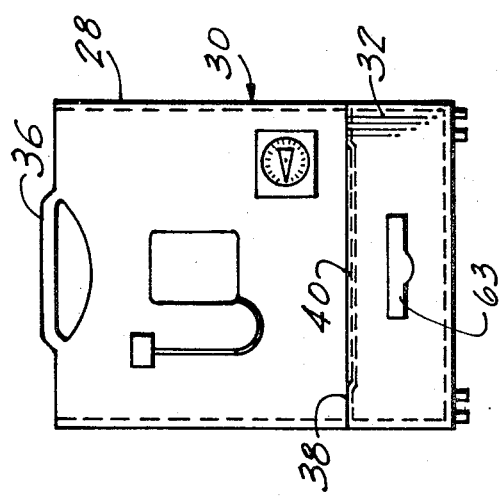
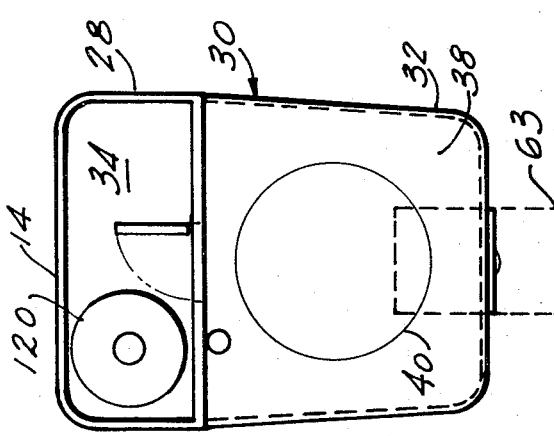
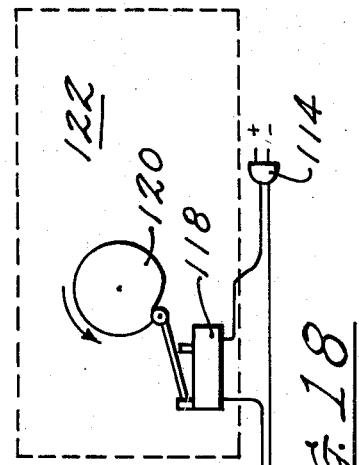
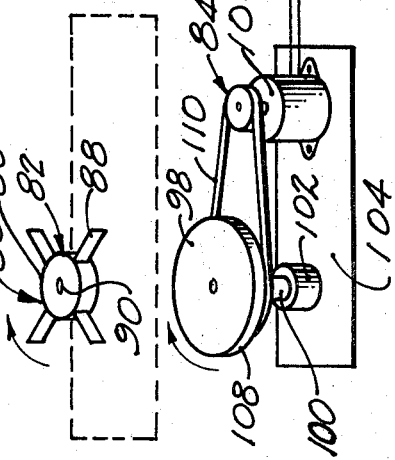
INVENTOR
HUBERT A. JANICEK, JR.
BY
ATTORNEY

United States Patent Office 3,368,718
Patented Feb. 13, 1968

3,368,718
SODA FOUNTAIN BEVERAGE DISPENSER
Hubert A. Janicek, Jr., 2696 Beechwood Ave.,
Doraville, Ga. 30040
Filed Mar. 3, 1966, Ser. No. 531,446
10 Claims. (Cl. 222—129.2)

ABSTRACT OF THE DISCLOSURE

A portable, self-contained, soda fountain dispenser unit primarily intended for home use and in a cabinet enclosing a pressurized tank which includes both the syrup and the water which is pressurized by $CO_2$ gas providing the carbonated water and the mixing with the syrup under pressure inside the tank so that the pressure in the tank causes the mixture of the carbonated water and the syrup from a single, compact unit.

---

Many people, including children, prefer beverages such as soft drinks and the like that are mixed on the spot with fresh carbonated water. Dispensing in this manner has the advantage of drawing from the dispenser an amount required to quench personal thirst.

When making carbonated beverages in standard soda fountains, a flavored syrup is required such as produced by "Coca-Cola," "Pepsi-Cola," "R C Cola," and the like. Such syrups may also be in this dispenser. Most arrangements that use these syrups are, however, quite expensive and are intended for commercial use such as in drug stores. There is a proper place and market and a demand for a soda fountain beverage dispenser of the present sort which may be manufactured and sold at a price which is within the reach of many families.

Generally described, the present soda fountain beverage dispenser is preferably carbonated, but of course, with small changes in arrangement, carbonation may be omitted from the drink.

The cabinet of the present device may be manufactured from plastic, sheet metal, or the like and comprises a generally rectangular structure includes a removable cover at the front portion which is removed to expose the cylindrical-like insulated, closed dispensing tank on which is mounted a dispensing valve. The dispenser may also have two or more dispensing valves in case of use of more than one flavor. Alternatively, to reduce cost, a manually operated selector valve may be used when employing two or more flavors.

A small flexible hose is attached to the valve means on the $CO_2$ dispenser and has a chuck thereon. A valve means controls the flow. The dispensing tank removably rests in a circular recess in the cabinet and is detachably connected to the $CO_2$ cylinder by means of hose and components noted above. The base of the cabinet contains inside, in the bottom, a portion of an agitating device which is circularly driven and contains a magnetic means which rotates without mechanical connection a magnetic responsive means inside the bottom of the closed dispensing tank. The top of the tank contains a sealed, detachable lid. The dispensing tank contains semi-circular syrup containers which correspond in shape and size with the interior walls of the tank. The syrup containers may have lids to prevent sloshing out of container, but such lids must be perforated or have some means that top of syrup has direct access to pressure within dispensing tank. A valve means is mounted on the tank. Therefore, the entire inside of the tank including the syrup container or containers, which are open to the inside of the tank, is pressurized by the gas. Normally, syrup in the circular containers, and water outside these containers but within the tank, are both under pressure forcing both fluids to the dispensing valve on the front of the tank.

Other important details of construction and features will be apparent from a more specific consideration of the device.

A primary object of this invention is to provide a simple and dependable carbonated beverage dispensing device within a price range available to many families or small organizations as opposed to more expensive commercial beverage dispensers.

Another object of this invention resides in the beverage dispensing tank which contains both water and the different syrups all pressurized inside the tank and mixed at the dispensing valve on the tank.

Still another object of this invention resides in the combination of the beverage dispensing tank with an agitation means on the beverage dispensing cabinet and a detachable $CO_2$ cylinder.

Another object of this invention resides in the specific construction of the cabinet itself in a beverage dispenser which lends itself to more economical construction and better operation for the home market.

An additional object of this invention resides in the combination of the $CO_2$ cylinder, shut off valve, clamp, regulator, check valve, hose, and chuck, which is simple, dependable, and economical.

An additional object of this invention resides in the arrangement of removable flavor compartments within the main beverage dispensing tank which are open to the pressure which is in the main tank but closed by the common closure for the tank.

Still another object of this invention resides in the combination of the cabinet, the $CO_2$ cylinder, the means for $CO_2$ delivery to dispensing tank, the agitation means, the dispenser tank and the flavor compartments, providing a simple, dependable and economical arrangement which permits this beverage dispenser to be sold to the non-commercial market.

Another object of this invention resides in the ability of the dispensing tank to be detachably removed from the cabinet but still maintaining connection with the $CO_2$ cylinder which may be some distance away, by means of extra length of hose between the two points. Such feature allows dispenser to be relocated easily, such as inside a conventional household refrigerator. Such hose may be very small, so that as the refrigerator door is closed over it, the refrigerator gasket prevents hose from being clamped too tightly. For added refrigerator tightness, a short length of hose may be specially made in an oval or semi-oval shape so as to provide a better contour against the refrigerator gasket.

Another object of this invention resides in the ability of this device, if properly operated, to produce a soft drink of unusually high quality. Generally, if the syrup is fresh, and local tap water is good, soft drinks carbonated properly will provide a good drink, however, it may be lacking in carbonation providing a flat drink, or it may be over carbonated which provides a drink with too much bite. One drawback to the use of small soda fountains has been the inability to provide the proper carbonation consistently and inexpensively.

Other and further objects and advantages of my invention will become apparent upon reading the following specification taken in conjunction with the accompanying drawings, in which:

FIG. 3 is a side elevation view of the $CO_2$ cylinder and the disassembled connections therefor.

FIG. 4 is a top plan view of the open combination syrup and water tank shown in FIG. 5.

FIG. 5 is a cross-sectional view taken substantially along lines 5—5 in FIG. 4 and with the removable pressure lid in disassembled relationship for assembly therewith.

FIG. 6 is a partial section view of a selection knob detail.

FIG. 7 is a diagrammatic view of syrup and water lines to dispensing valve, using selector knob for choice of two or more flavors.

FIG. 8 is a plan view of the regulating valve.

FIG. 9 is a side elevation view of the preferred location of the dispensing valve in relation to the height of the closed dispensing tank.

FIG. 10 is a cross-sectional view taken substantially along lines 10—10 in FIG. 5 and showing a detail of a preferred seal between dispensing tank and dispensing valve.

FIG. 11 is a cross-sectional view taken substantially along lines 11—11 in FIG. 5 and shows one method of mounting dispensing valve firmly to dispensing tank as shown in FIG. 14.

FIG. 12 is a cross-sectional view showing an alternate method of mounting dispensing valve to dispensing tank.

FIG. 13 is a cross-sectional view showing a second alternate method of mounting the dispensing valve to the dispensing tank.

FIG. 14 shows an outline of dispensing valve from a front view to indicate latching tabs to secure dispensing valve or dispensing valve assembly to dispensing tank.

FIG. 15 is a top plan view of the cabinet of FIG. 2 with the cover removed.

FIG. 16 is a front elevation of the cabinet shown in FIG. 15.

FIG. 17 is a side elevation view of a cabinet shown in FIG. 15 and 16.

FIG. 18 is a disassembled respective view of one form of the non-mechanical agitator with magnetic means and control time operation.

FIG. 19 is a diagrammatic view of syrup and water lines to the dispensing valve, one flavor compartment.

FIG. 20 is a perspective view of the preferred type of dispensing valve body manufactured by injection molding process.

FIG. 21 is a side elevation view of an alternative mixing valve arrangement.

Figure 1:
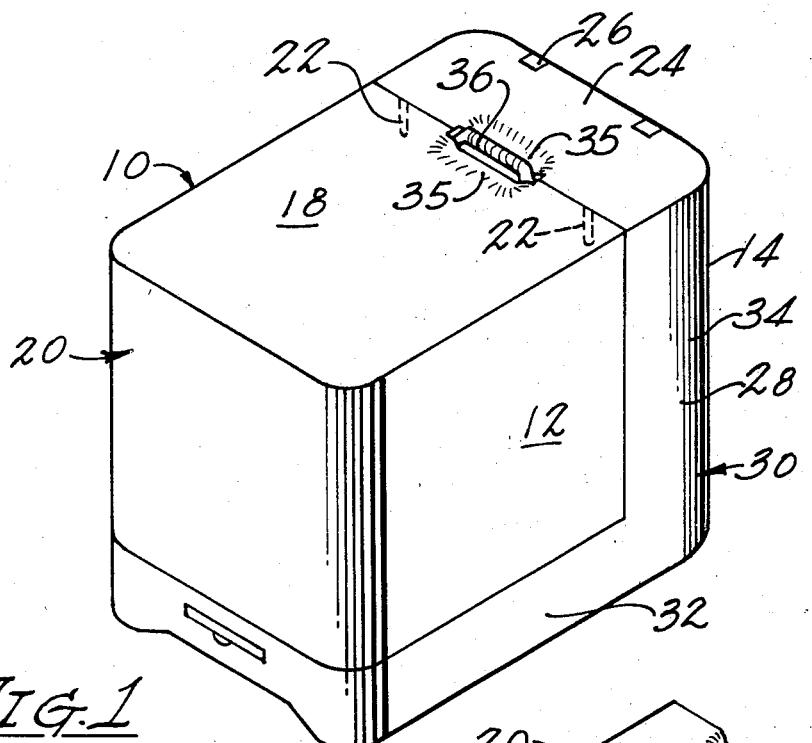
FIG. 1 is a perspective view of the beverage dispenser cabinet in closed, portable condition.
Figure 2:
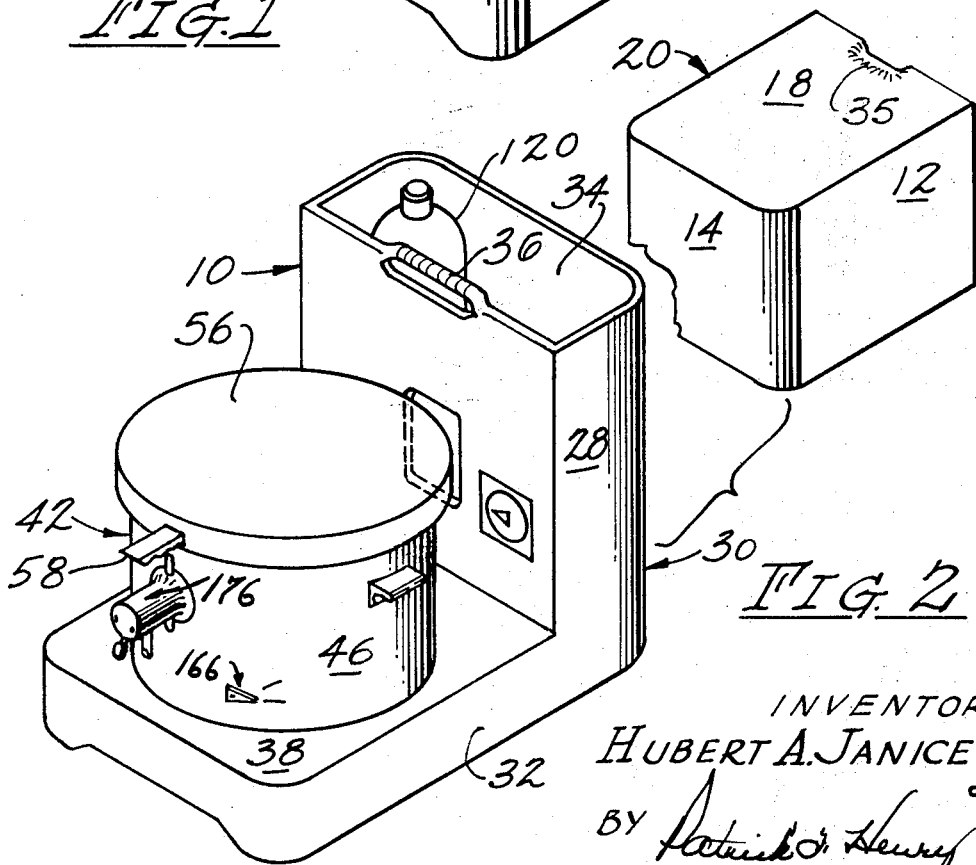
FIG. 2 is a perspective assembly view of the beverage dispenser shown in FIG. 1 with the cover removed.

The completely assembled device with the portable cabinet is referred to herein generally by reference numeral 10 and comprises a three-dimensional cabinet structure having sides 12, ends 14, and top 18. A removable cover portion designated generally by reference numeral 20 includes portion of sides 12, ends 14, and top 18 and is open on its bottom. Cover 20 is held in place by friction latches 22 or other suitable means. The remainder of top 18 is divided into a hinged lid 24 having hinges 26 connected to the back end 14 of cabinet 10. Sides 12 also include the portions of the removable cover 20 as well as the stationary portions 28 which are part of a generally L-shaped permanent base structure 30 comprising a hollow base portion 32 and a hollow vertical $CO_2$ cylinder portion 34. The entire cabinet may be made from sheet metal, plastic or other suitable material in an attractive cover, joined together with smooth neat edges presenting a nice appearance. Top 18 is formed at the end with recessed portions 34 in both the hinged lid 24 as well as the cover portion 20 to create a recess beneath a permanent handle 36 which is formed on one edge of the vertical hollow portion 34 of the permanent base structure 30. Handle 36 provides a means for lifting and carrying the entire beverage dispenser.

As readily seen in FIGS. 15, 16, and 17, the base 32 has a flat upper portion 38 with a circular recess 40 in it to receive the bottom of the main pressurized dispensing tank 42 which is removably positioned in a stable manner in the recessed circular opening 40.

Tank 42 is a closed container manufactured from metal or the like, and may be double walled with an interior wall 44 and an exterior wall 46 between which may be placed Styrofoam, glass fibers or other insulation. The top of tank 42 has a peripheral, circular flange 50 thereon which has discontinuous portions or notches therein at 52 cooperating with lugs 54 formed as peripheral, circular flanges on the removable lid 56 which has a handle 58 and may be double walled with exterior wall 60 and interior walls 62 provided with the insulation 48 the same as the tank 42 itself. A drip tray 63 catches the drip from the dispensing valve.

The closure of lid 56 has a center cylindrical indentation 66 therein in which is mounted valve 68. This valve has a double purpose. First it is a relief valve, set to relieve pressure inside tank 42 if it should exceed a predetermined maximum. A second purpose is to provide a method to manually depressurize the tank 42 by operating valve 68 by means of a small handle or lever.

Tank 42 has removably positioned therein a plurality of semi-circular, three dimensional syrup tanks 70 each one of which is opened at the top 72, has a connecting means for a syrup delivery line at the bottom, and which is generally of the same shape and size as the interior wall 44 of tank 42. It is possible to make the syrup tank 70 take up the entire circular surface of the inside of tank 42 and there may be two tanks 70 or sections of one or three or more as desired. Each of the separate syrup tanks 70 may be provided with a separate flavor or a separate type of drink such as cola, ginger, orange, natural fruit or other drink.

Handles 76 on tank 48 make it easier to lift and position the tank from the base 32.

All component parts on the dispenser where a food product comes into contact with it, such as syrup tanks 70, interior wall 44, and agitating means 80 should conform to existing laws as pertain to food. Materials that are highly inert should be used also in order that no taste will result from contact with syrups or carbonated water.

One method of increasing the speed of carbonation where water and $CO_2$ are commingled is to agitate the two under pressure in the same pressurized tank. Shaking tank 42 would speed carbonation. This method takes a great deal of time when water quantities are increased, and results in an undersirable amount of manual labor.

A further assist to the speed of carbonation is the temperature. The lower the water temperature, the faster $CO_2$ mixes with the water. In the instant device, very cold ice water is used, or tap water is mixed with a generous supply of cracked or chipped ice. Agitation of the water and the ice within the tank may be accomplished by an agitating means labeled generally by reference numeral 80 and comprising an agitator 82 inside the tank which is non-mechanically operated by the agitating drive mechanism designated generally and overall by reference numeral 84 and shown in FIG. 18.

In order to use this type of agitating system, tank 42 and area of cabinet covered by recess 40 should be made of non-magnetic or near non-magnetic materials.

The agitator structure 82 inside the tank comprises an agitator 86 with blades 88 mounted on shaft 90. The agitator blades 88 and the entire agitator 82 are covered by a grill work structure 92 comprising radiating members 94 mounted on legs 96. At least a portion of the agitator 82, such as the center disc-like portion on shaft 90, is magnetically effected and may be manufactured from cast iron or the like and which may be hermetically covered with an inert material such as plastic or the like.

The other part of the agitating means 80 is the rotating mechanism 84 shown in FIG. 18 and which comprises a disc like member 98 mounted on a shaft 100 journaled in a support 102 on a plate 104 and on which is mounted an electric motor 106 driving a pulley 108 connected to disc 98 through a drive belt 110. Disc 98 is a magnet, usually produced to get a strong force with little weight, such as ceramically produced magnets.

Speed of the agitator is set at an efficient rate consistent with design of blades 88, diameter of tank 42, grill-work structure 92, and similar factors.

A conventional two wire electric cable 112 connects the motor 106 to a 110 volt plug 114. The wire 112 has one side 116 thereof passing through a microswitch 118 controlled by a cam actuator 120 operated by a conventional spring wound timer 122 to agitate for a given length of time and then stop. Spring wound timers generally have a desirable bell sound at the end of the cycle indicating completion of agitation.

Electrical timers are also on the market and may be used instead of spring wound timer 122. In this case the timing mechanism would be electrically operated much the same as an electrical clock. Such timers are in common use to operate radios, stoves, and so forth.

Also motor 106 may be spring operated by a manual winding operation. This method would allow operation of dispenser without electric power. Manual spring motors are commonly found.

As mentioned earlier, the entire interior of the dispensing tank 42 is pressurized. This is accomplished by means of a conventional $CO_2$ cylinder which is available commercially, and which has a screw thread fitting neck 122 on the upper portion thereof into which is screwed a conventional shut-off valve 124 of the sort manufactured by Sherwood-Selpac, 120 Church Street, Lockport, N.Y., 14094. Onto shut-off valve 124 is clamped a yoke 125 with manual knob for securing, onto which is mounted a regulator 126. Regulator 126 has an outlet for regulated pressure 128 to which is connected a check valve 130 which allows flow of gas in direction of tank 42 only, and prevents any reverse flow from tank 42 if pressure in tank builds up higher than regulated pressure set on regulator 126. Hose 132 is connected to check valve 130 on one end and to chuck 132 on the other. Chuck 132 holds pressure when not in use, but is designed to mate valve 133 which holds pressure in tank 42 when disconnected. Proper connection between chuck 132 and valve 133 allows flow of gas into tank 42 at regulated pressure. Hose 134 connects valve 133 which is mounted on the side of tank 42 to the lower portion of tank 42 on the inside. For more efficient carbonation, a diffuser stone 135 is attached to hose 134 and located in near proximity to agitator 82. This stone provides a relatively large surface wherein the $CO_2$ may come into direct contact with water to be carbonated, and also provides numerous microscopic orifices through which $CO_2$ is forced, allowing the water to absorb the gas more readily.

As is commonly konwn, water has the ability to hold $CO_2$ gas under certain conditions. In particular, water holds more $CO_2$ at lower temperatures than at high temperatures. It is also true that $CO_2$ will combine with water in greater and greater amounts as the pressure on the water increases. It is also true that there is a maximum limit to how much $CO_2$ can be absorbed by water at a given pressure and temperature. Saturation of water by $CO_2$ is normally given in volumes of $CO_2$, that is, when a given volume of water holds an equal volume of $CO_2$ it is said to hold one volume of $CO_2$.

For a quality drink, the proper carbonation, or the proper number of volumes of $CO_2$ in the drink, will be required with consistency. Some flavors have a higher requirement of $CO_2$ volumes than others for a satisfactory drink. In the instant device, in the case of double flavors where there is no different requirement as to $CO_2$ there will be no problem. In case one drink requires less than the other, an adjustment in the dispensing valve may be necessary. Such valves are being used by some firms on the commercial market. Basically, water carbonation is set for the highest requirement, and when a lower requirement is required for a flavor, the valve agitates the soft drink more and more violently while being dispensed so as to lower the $CO_2$ content to the proper amount for the flavor at hand.

In order to get a high quality of carbonation, a batch system is used here as opposed to a continuous carbonation system used in most commercial arrangements.

Temperature control is effected by simple means. Insulating the "ice water" inside tank 42 provides a relatively stable temperature for some time. With present insulating materials this can last for several hours, much longer than necessary to carbonate properly. A second means of control is to use only ice water of a certain temperature, or to achieve the same result, mix tap water with generous proportions of ice cubes, chips, or pebbles. Even with an ambient temperature for syrups, tanks 70, and other internal parts, the temperature will stabilize after a few minutes of agitation by 82 to a point somewhere between 34 degrees F. and 42 degrees F. in most cases. It is to be noted that most household refrigerators can be adjusted to temperatures in this range also.

Depending upon the quality of dispensing valve on tank 42, a pressure can be set, more or less permanently, on regulator 126, that will assure an optimum carbonating condition for the majority of refrigerators in use today. Also, it is also true that ice water will be ice water within close temperature limits no matter where it is mixed. This fact coupled with a well designed dispenser as herein described will provide consistent excellent results in the carbonation of drinks.

In contrast, should temperature of the water and syrup rise to the vicinity of 45 degrees F. or above, excess foaming action will result at dispensing valve when a drink is required. It is not only an inconvenience in slowing up the filling of glasses, but also quality suffers since the required volumes of $CO_2$ will not remain in the drink, even if dispensed over ice in the glass. Thus it is most important to keep ice in the dispenser or keep tank 42, with portions of insulation removed, in a refrigerator whose temperature is preferably below 40 degrees F.

Thus in summation, the basic operation of the invention is as follows:

Remove lid 56 in order to pour required flavor or flavors into tanks 70. Add overabundance of ice with tap water to center portion of tank 42. Close lid 56 onto tank 42 and engage to make pressure seal. Attach chuck 132 to tank valve 133. Set timer 122 to approximately twenty-five minutes. Place tank 42 in place on cabinet at location 40. At the sound of the bell, carbonated beverage is ready to dispense.

It is also recommended that chuck 132 remain engaged to valve 133 during dispensing tank 42 until tank is depleted, not only to supply a steady pressure for dispensing, but also to keep water within the tank at the proper $CO_2$ saturation level. If this is not done, as water is dispensed for drinks, $CO_2$ from the remaining water will fill void caused by the depletion, pressure within tank 42 will drop, and $CO_2$ level of remaining water will be lower. Thus quality of remaining drinks may become lower.

In FIG. 19 there is shown one type of dispensing valve 150 using a single syrup container 152 delivering syrup through a line 154 and carbonated water through a line 156. The dispensing is accomplished through an outlet 158 by manual operation of a lever 160.

In FIG. 7 there is shown an alternative method of dispensing valve arrangement wherein there has been added additional syrup containers 162 having respective lines 164 connected to a syrup selector control valve 166 having a manually operated selector control lever 168 thereon. The selector 166 may be manually set (see FIG. 6) to select the particular flavor, such as cola or ginger ale, thereby determining at valve 166 which line 164 empties through line 154.

In FIG. 21 there is shown still another alternative form of dispensing in which instead of a single mixing dispensing valve 150 of the sort shown in FIGS. 7 and 19, there are two or more such individual valves designated by reference numeral 170 and each having an independent syrup line 172, 174 respectively leading from the respective syrup container such as containers 152, 162 shown in FIG. 7. Each of the valves 170A or B in FIG. 21 is provided with a manual control lever 160 and an outlet spout 158 the same as in the type of valve shown in FIGS. 7 and 19. In the operation of the dispensing arrangement in FIG. 21, each respective and different syrup A or B, etc., is selected from an independent dispensing valve 170 rather than selecting syrup as by moving a syrup control lever such as 168 in FIG. 6.

In FIG. 20 there is shown the type of dispensing valve 176 which includes the manual operating lever 178 and outlet spout 180 and may be made in one piece with a flange thereon, as by molding from plastic material.

The dispensing valve 170, and the valve 176, may be supported on the tank 42 in the manner shown in FIG. 10, through the use of a metal bracket 184 attached to the valve 170 by screws 186 and having the bent and curved edges thereof positioned on the dispensing tank 42 by means of tabs or levers 192 shown in FIG. 14 sealed tightly by a rubber gasket 190. The tabs 192 may be placed on the tank 42 in a number of different arrangements. For example, in FIG. 11 tabs 192 fit into a slot in tank 42. In FIG. 12, tabs 192 are provided with a screw 196 which fits into a tapered slot 198 in tank 42. In FIG. 13, the slot 204 at tank 42 is curved and receives a modified form of support tab 200 which has a ridge 202 thereon fitting into the curvature of the slot 204. It should be noted that both valves 170 and 176 may be supported in one of the several ways on the tank 42. The mounting of tabs 192, or other support, attaches the valve 170 in a fluid tight relationship.

In FIG. 9 there is shown a relationship in the dispensing tank 42 which is important in the dispensing from a valve such as valve 176. The total height of the container in FIG. 9 is designated as H and one half of the height of tank 42 is designated as H/2. The approximate center of a valve such as 176, or the valve 150, for example, is located in the top portion of tank 42 at a position above the center measured vertically and represented by H/2. It is very worthwhile in the dispensing of the beverage and the proper performance and accomplishment of the desired mixture that the dispensing valve in the present arrangement be located in the area above the middle portion of the tank. This places valve 176 in a position somewhere between the top of the tank 42 and the middle of the tank represented by H/2. A particularly desirable performance is accomplished in the present arrangement if the dispensing valve 176 or any other dispensing valve arrangement is located in this manner.

While I have shown and described a particular embodiment of my invention, and at times a suggested substitute or modification, this is by way of illustration only and does not constitute any form of limitation on the scope of my invention since various alterations, changes, substitutions, modifications, eliminations, deviations, ommissions, revisions as to form and shape, and other departures may be made in what is shown and described herein without departing from my invention as defined in the appended claims.

What is claimed:

1. In a soda fountain beverage dispenser of the class described,
    (a) a cabinet having a beverage dispenser thereon,
    (b) said dispenser comprising a pressure sealed beverage dispensing tank removably positioned in said cabinet and having a dispensing valve thereon, said tank normally having a beverage liquid therein,
    (c) a gas container in said cabinet having gas under pressure therein, duct means connecting the gas container with the inside of said dispensing tank to carbonate the liquid, and
    (d) at least one open syrup container within said dispensing tank and being open to the gas pressure within said dispensing tank and duct means connecting the syrup container and the tank with the valve.

2. The device in claim 1, including:
    valve means on said gas container including a pressure release means and a pressure regulating means which automatically regulates the gas pressure.

3. The device in claim 1, wherein:
    the distance from the top of the tank to the center of the dispensing valve is less than one-half the total height of the tank.

4. The device in claim 1, including:
    an agitating device inside said dispensing tank and there being an agitating drive means on said cabinet operable to operate said agitating device within said dispensing tank, 5. The device in claim 1 including:
    (e) a control means including a pressure release means and a pressure regulating means which automatically regulates the gas pressure,
    (f) check valve means preventing a back flow of gas pressure and allowing the gas pressure in the direction of the dispensing tank,
    (g) an agitating device inside said dispensing tank and there being an agitating drive means on said cabinet operable to operate said agitating device within said dispensing tank.

6. The device claimed in claim 1, wherein:
    several different syrup containers are within said dispensing tank,
    said dispensing valve on said tank for dispensing drink which includes syrup mixed with carbonated water under pressure, and
    said dispensing valve having a selection means thereon for selecting one of several flavors contained within said tank, 7. The device claimed in claim 2, including:
    a detachable connection between said tank and said gas container, and
    coupling means on said cabinet including a fitting to which said detachable connection from said tank and said gas container may be connected to cause communication of gas pressure therebetween.

8. The device in claim 1, including:
    a detachable closure on said dispensing tank having pressure seal means thereon cooperating with said tank to provide a pressure tight seal.

9. The device in claim 8, wherein:
    said dispensing tank is cylindrical, and said syrup containers are semi-circular.

10. The device in claim 9, wherein:
    said cabinet is L-shaped and has a vertical compartment in which the gas container is housed, and a horizontal compartment on top of which said dispensing tank detachably rests and inside of which said agitating drive means is located.

References Cited

UNITED STATES PATENTS

| | | | |
|---|---|---|---|
| 829,762 | 8/1906 | Boyer et al. | 222—132 |
| 942,165 | 12/1909 | Cornish | 222—129.1 X |
| 1,606,574 | 11/1926 | Hix | 222—129.1 |
| 1,672,930 | 6/1928 | Denman | 222—129.1 |
| 2,498,524 | 2/1950 | Booth | 222—129.1 X |
| 2,750,076 | 6/1956 | Welty et al. | 222—129.1 |
| 2,894,377 | 7/1959 | Shikles et al. | 222—129.1 X |
| 3,119,531 | 1/1964 | Jacobs | 222—333 X |
| 3,195,779 | 7/1965 | Nicko | 222—129.1 |
| 3,240,395 | 3/1966 | Carver | 222—129.1 |

FOREIGN PATENTS

| | | |
|---|---|---|
| 18,044 | 8/1908 | Great Britain. |

WALTER SOBIN, *Primary Examiner.*